United States Patent [19]

Wilson et al.

[11] 4,327,765
[45] May 4, 1982

[54] BUTTERFLY VALVE HAVING LEAK DETECTING MEANS

[75] Inventors: Thomas A. Wilson; James D. Ward, both of Tulsa, Okla.

[73] Assignee: Dover Corporation, Tulsa, Okla.

[21] Appl. No.: 178,512

[22] Filed: Aug. 15, 1980

[51] Int. Cl.³ ............................................. F16K 1/226
[52] U.S. Cl. ..................................... 137/312; 251/306
[58] Field of Search ................ 137/312, 375; 251/305, 251/306, 307, 308

[56] References Cited

U.S. PATENT DOCUMENTS

| | | | |
|---|---|---|---|
| 3,026,083 | 3/1962 | McLaren et al. | 251/306 |
| 3,043,557 | 7/1962 | Stillwagon | 251/306 |
| 3,059,897 | 10/1962 | Jensen | 251/308 |
| 3,473,554 | 10/1969 | King | 137/312 |
| 3,612,483 | 10/1971 | Pool | 251/306 |
| 3,837,616 | 9/1974 | Castriota-Scanderbeg | 251/306 |
| 4,067,352 | 1/1978 | Halpine | 251/306 |

FOREIGN PATENT DOCUMENTS

| | | | |
|---|---|---|---|
| 232814 | 8/1963 | Fed. Rep. of Germany | 251/306 |
| 901607 | 7/1962 | United Kingdom | 137/312 |
| 1311016 | 3/1973 | United Kingdom | 251/306 |

*Primary Examiner*—George L. Walton
*Attorney, Agent, or Firm*—Head & Johnson

[57] ABSTRACT

An improved butterfly valve having leak detecting means, the valve body having a flow passageway therethrough, and co-axial top and bottom shaft openings and a seat circumscribing the flow passageway, a disc having an uninterrupted circumferential sealing surface having two spaced apart circumferential sealing contacts providing a circumferential valley therebetween. An upper and lower shaft portion is received in the body shaft openings, one of the shaft portions being secured to the disc providing means of positioning the disc and one of the shaft portions having a passageway therein communicating with the exterior of the valve body, the disc having a passageway communicating with the disc circumferential valley and the shaft passageway so that fluid leakage past either one of the disc sealing contacts will be conducted exteriorly of the body as an indication of loss of valve integrity when the valve is in the closed position.

8 Claims, 6 Drawing Figures

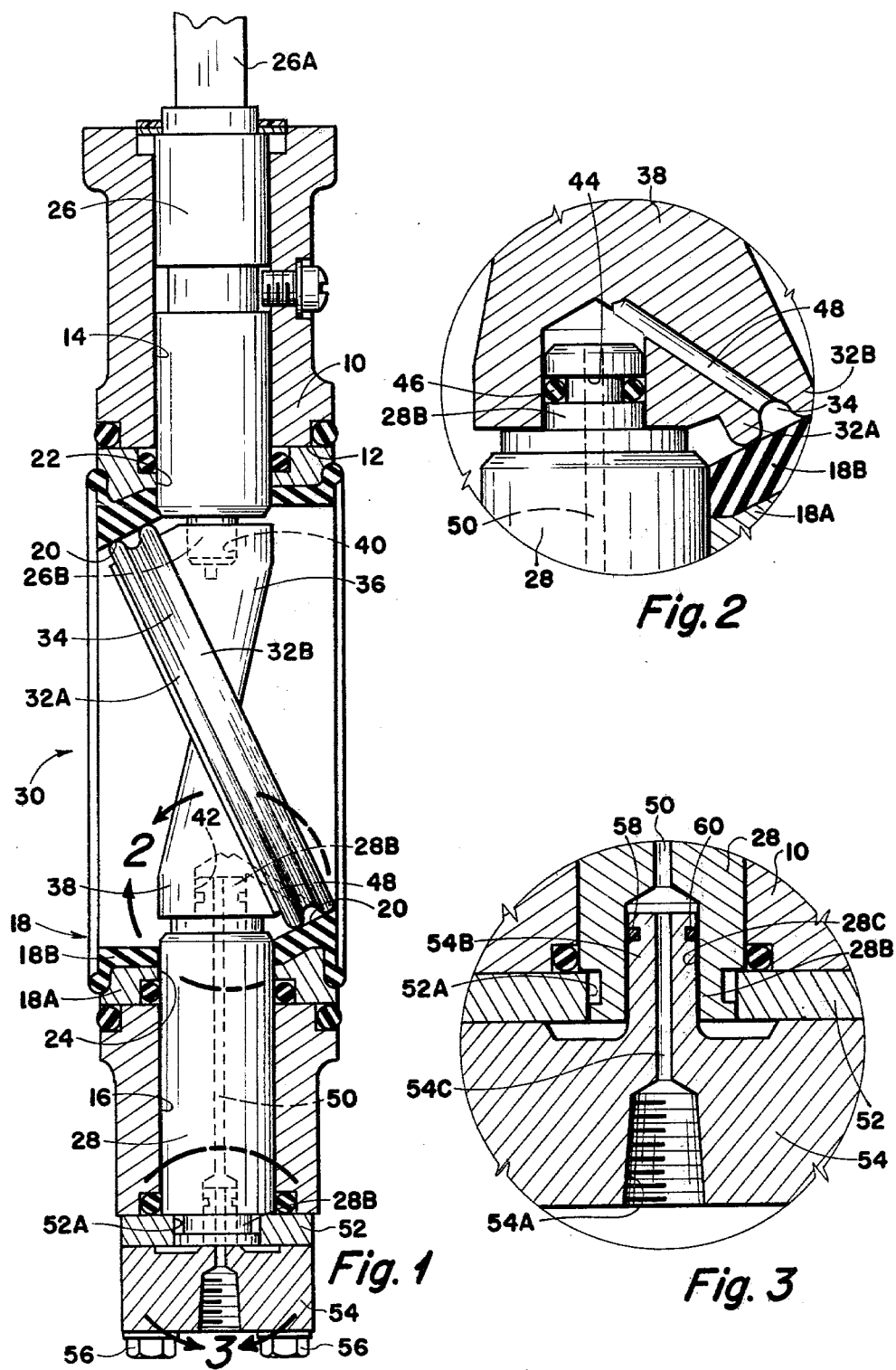

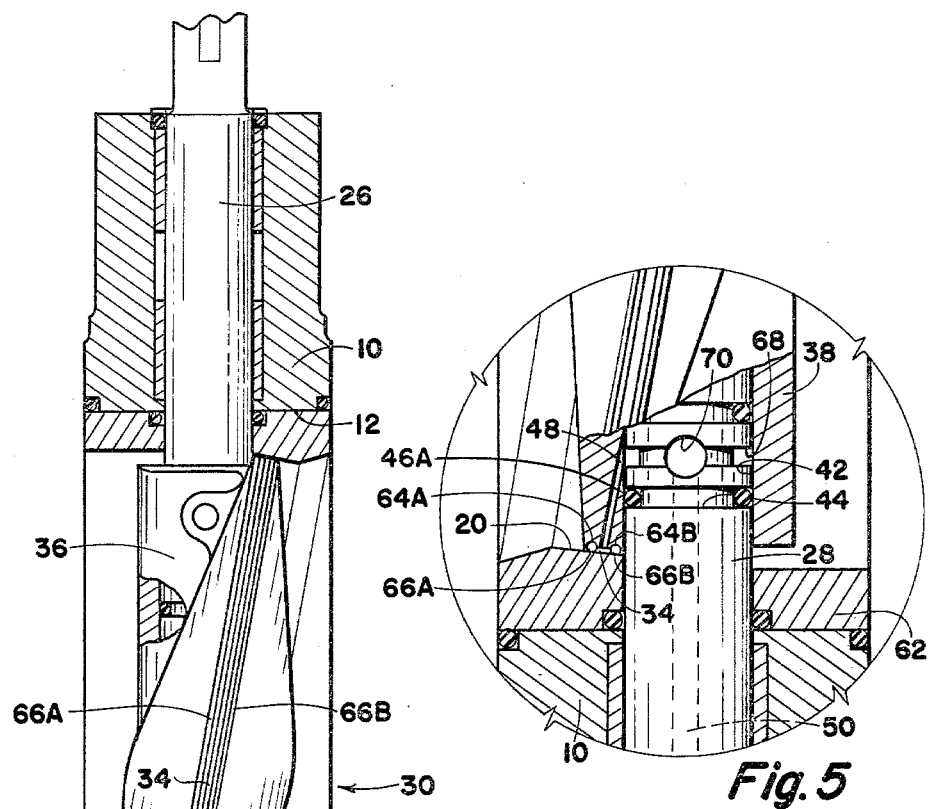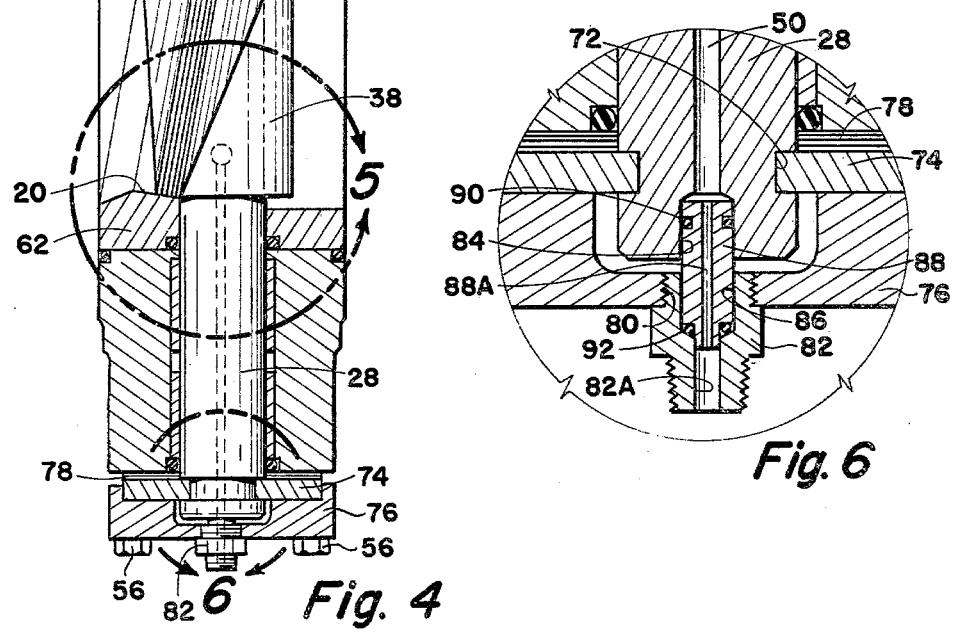

BUTTERFLY VALVE HAVING LEAK DETECTING MEANS

BACKGROUND OF THE INVENTION

1. Field of the Invention

This invention relates to butterfly or disc-type valves of the type having a body with a flow passageway and a disc with a circumferential sealing surface, the invention providing means of indicating the integrity of the seal when the valve is in closed position.

2. Description of the Prior Art

Butterfly valves have long been utilized in industry and are commonly employed because of their economy of construction, simplicity, durability, ease of repair, and many other reasons. In many applications of valves it is desirable to be able to determine, when the valve is in the closed position, that no leakage is occuring through the valve. This is sometimes referred to as "integrity assurance". One means of obtaining integrity assurance is to place two valves in position in series with a short pipe or conduit therebetween. When the valves are both closed, an opening in the connecting conduit will indicate whether one valve or the other is leaking. This arrangement, while functioning satisfactory, is extremely expensive and consumes much space. In addition, it requires the simultaneous operation of two valves which is cumbersome and is also subject to human error.

In order to provide means of checking the integrity of valves, particularly valves of the butterfly type, others have provided means within the valve itself. Of particular relevance is U.S. Pat. No. 4,067,352 entitled "VALVE HAVING INTEGRITY ASSURANCE MEANS" issued Jan. 10, 1978. In this patent a butterfly valve is disclosed including a valve disc having parallel spaced apart circumferential sealing contacts. Formed in the body of the valve, and extending through the body sealing surface, is a small diameter opening. When the valve is in the closed position, the spaced apart sealing contacts are to either side of the opening and thus communication is provided through the valve body so that leakage past either one of the paralleled sealing contacts can be detected.

While the invention illustrated in U.S. Pat. No. 4,067,352 represents an improvement over the prior state of the art, nevertheless, it introduces some difficulties. Since the opening through the valve body must extend through the body sealing surface, such opening provides means for a possibility of leakage of fluid from within the valve to the space between the valve seat and the valve body. The arrangement of the patent requires the valve disc to be precisely positioned when in closed position so that the valley area between the adjacent disc sealing contacts is in alignment with the opening in the valve body. If the disc is not precisely positioned, then this communication is not established and the integrity of the valve cannot be verified. Another difficultly is that of maintaining a controlled diameter of an opening through an elastomeric member. For the valve to close against fluid pressures, it is necessary that a resilient force exists between the elastomeric seat and the disc and this, of course, tends to slightly displace the elastomeric member which, if the opening through the member is of small diameter, tends to close it.

For these and other reasons, the valve design as taught in U.S. Pat. No. 4,067,352, has not found commercial acceptance.

It is an object of the present invention to provide an improved butterfly valve having leak detecting means which overcomes the disadvantages of the prior art.

More particularly, an object of the present invention is to provide an improved butterfly valve having leak detecting integrity assurance means which does not require an opening extending through the valve body and, more importantly, does not require an opening extending through the valve seat.

These general objects as well as other and more specific objects of the invention will be fulfilled in the following description and claims taken in conjunction with the attached drawings.

SUMMARY OF THE INVENTION

An improved butterfuly valve having leak detecting means is provided. The valve body has a flow passageway therethrough and a co-axial top and bottom shaft opening intersecting the flow passageway. The body has a valve seat therein circumscribing the flow passageway. In one embodiment the valve seat employs a replaceable elastomeric member, and in another embodiment, the valve seat is of metal.

A disc is rotatably supported within the valve body fluid passageway. The disc has a circumferential sealing surface which is in a plane oblique to the axis of the shaft openings in the body. The disc is rotatable between an open position permitting fluid flow through the valve to either side of the disc and a closed position wherein the disc circumferential sealing surface sealably contacts the valve seat around the full periphery thereof to block flow through the passageway. The valve seat and the disc seating surface are cooperatively configured to provide two spaced apart circumferential uninterrupted sealing contacts which provide a reduced external diameter circumferential valley therebetween. In one embodiment the valve disc is of metal and the sealing contacts are provided by increased diameter sealing ridges, the body sealing surface being elastomeric. In another embodiment the disc sealing contacts are provided by elastomeric members, such as O-rings, received in paralleled grooves in the disc sealing surface, the valve body seating surface being of metal. An upper and lower shaft are received in the body shaft openings, and one of the shafts is secured to the disc and extends externally of the valve body providing means of positioning the disc between open and closed positions. One shaft has a passageway therein communicating with the exterior of the valve body. The disc has a passageway communicating from the disc sealing surface circumferential valley to the shaft passageway. Thus a passageway is provided between the disc sealing surface and the exterior of the valve through the shaft so that the integrity of the valve when in closed position may be verified. No communication between the valve body bore and fluid passage exists. Thus the body member may be grey iron or carbon steel even when highly corrosive fluids are being handled.

DESCRIPTION OF THE DRAWINGS

FIG. 1 is an elevational cross-sectional view of a butterfly valve incorporating the principles of this invention, the valve being of the metal disc, elastomeric liner type, the disc being shown in closed position, the disc and shaft portions being shown in elevational view and the valve body and body liner elements being shown in cross-sectional view.

FIG. 2 is an enlarged cross-sectional view of the disc lower boss and upper end of the lower shaft portion of the portion 2 of FIG. 1.

FIG. 3 is an enlarged cross-sectional view of the valve body bottom plate and the lower end of the lower shaft portion of the portion 3 of FIG. 1.

FIG. 4 is an elevational cross-sectional view of an alternate embodiment of the valve of this invention wherein the valve body liner is of metal and the disc has elastomeric sealing contacts thereon, the disc being shown in closed position.

FIG. 5 is an enlargement of the portion indicated by the numeral 5 of FIG. 4 showing the lower end of the disc and the upper end of the lower shaft portion and illustrating means whereby communication is provided between the disc circumferential valley area and a passageway which extends to the exterior of the valve.

FIG. 6 is an enlarged portion as shown by the numeral 6 in FIG. 4 showing the lower end of the lower shaft portion and the valve body lower plate and showing means of communicating the passageway within the shaft to the exterior of the valve body.

DETAILED DESCRIPTION OF THE PREFERRED EMBODIMENT

Referring to the drawings and first to the embodiment of FIGS. 1, 2, and 3, a preferred arrangement of the invention is illustrated. The valve body is indicated by the numeral 10, the body having a flow passageway 12 therethrough. Drilled in the body 10 is an upper shaft opening 14 and a co-axial lower shaft opening 16. Positioned in the valve body flow passageway 12 is a valve liner 18 comprised of a base portion 18A and an elastomeric portion 18B. The portions 18A and 18B may be of a variety of combination of materials but the purpose of liner 18 is to provide a body sealing surface 20 of elastomeric property, that is, slightly compressible. The body sealing surface 20 is circumferential and in a plane oblique to the axis of shaft openings 14 and 16.

Liner 18 includes openings 22 and 24 which are co-axial with the upper shaft opening 14 and lower shaft opening 16.

Rotatably received in the body upper shaft opening 14 and liner upper opening 22 is upper shaft 26 which has a portion 26A extending exteriorly of the valve body providing means for rotatably positioning the disc which will be described subsequently. Positioned in the body lower shaft opening 16 is lower shaft 28, the shafts 26 and 28 being co-axial.

Received within the valve body fluid passageway 12 is a rotationally positionable disc generally indicated by the numeral 30. The disc has a circumferential sealing surface which is formed of two spaced apart circumferential uninterrupted sealing contacts 32A and 32B. Between sealing contacts 32A and 32B is a reduced external diameter circumferential valley 34.

Integrally formed with disc 30 is an upper boss portion 36 and a lower disc boss 38. The upper boss 36 has a recess 40 therein which receives a downwardly extending portion 26B of the upper shaft. The recess 40 and shaft portion 26B are configured to non-rotatably engage each other, such as by the recess being non-circular or the shaft portion 26B may be locked to the boss by means of a key or pin (not shown). In any event, the upper shaft 26 is secured to the disc 30 so that the rotation of shaft 26 by disc 30 is rotatably positioned within the valve body.

Rotatably received within the body lower shaft opening 16 is the lower shaft 28, as previously indicated, which has an integral reduced diameter upwardly extending portion 28B which is received in a recess 42 in the disc lower boss 38. As better shown in FIG. 2, the shaft reduced diameter upper portion 28B has a circumferential groove 44 therearound which receives an O-ring 46. Thus the interior of the disc boss recess 42 is sealed by the O-ring. Extending from the disc sealing surface valley area 34 to the lower disc boss recess 42 is a disc passageway 48. Passageway 48 is of small diameter, less than the width of valley area 34.

Lower shaft 28 has an axial shaft passageway 50 extending the full length thereof so that the passageway 50 communicates by way of recess 42 and disc passageway 48 with the valley area 34 in the disc seating surface.

Positioned on the lower end of the valve body 10 is bottom split thrust washer 52 having an axial opening 52A therethrough which receives a reduced diameter lower portion 28B of the lower shaft. Secured to the lower end of the valve body, and retaining the positioning plate 52 is a body lower plate 54, retained by bolts 56.

Referring to FIG. 3, the arrangement of the lower end of the lower shaft 28 can better be understood. The bottom plate 54 has a threaded opening 54A and an integral reduced diameter upwardly extending portion 54B which is co-axial with thread openings 54A. A bottom plate passageway 54C communicates the threaded opening 54A with the upper end of the integral plate portion 54B.

Drilled in the lower end of the lower shaft 28 is a recess 28C which rotatably receives the bottom plate reduced diameter integral portion 54B. Formed on the exterior of the bottom plate upwardly extending portion 54B is a circumferential groove 58 receiving an O-ring 60 so that the interior of the bottom shaft recess 28C is sealed to the bottom plate portion 54B. In this manner the shaft passageway 50 sealably communicates with the bottom plate passageway 54C and threaded opening 54A. Thus, it can be seen that communication is provided from the disc seating surface valley area 34 to exterior of the valve body through disc passageway 48, disc boss recess 42, lower shaft passageway 50, lower plate passageway 54C, and threaded opening 54A.

When the disc 30 is in the closed position as illustrated, the integrity of the valve can be verified by various devices connected to the threaded openings 54A. For instance, a guage may be attached to opening 54A with means to vent the guage. If the vent is closed and pressure builds towards that of the fluid pressure within the valve, such would indicate that one or the other of the valve seals 32A or 32B is permitting leakage thereacross. Another method is to apply pressure to a fitting connected to threaded openings 54A to a level slightly above that of the fluid pressure within the valve. If the pressure level is retained by the valve disc, it indicates that no leakage is occurring. A very simple method is to merely position a petcock type valve in threaded opening 54A; and when the valve is closed, the petcock can be opened. Any fluid which is initially trapped in the passageways when the disc is in the open position will be drained off, but if continued leakage occurs through the petcock, then it would indicate that the valve is leaking. Thus it can be seen that many different arrangements can be employed to verify the integrity of the valve.

FIGS. 4, 5, and 6 illustrate an alternate embodiment of the invention. The valve body 10 is essentially the same as that previously described. The valve liner 62 is of the metal type, that is, it does not include an elastomeric portion; however, it does provide a valve body sealing surface 20 completely circumscribing the flow passageway through the valve body. The main difference in the alternate embodiment is that of the sealing surface on disc 30. Formed in the disc sealing surface are parallel circumferential grooves 64A and 64B (see FIG. 5) which retain O-rings 66A and 66B. The O-rings 66A and 66B extend uninterrupted around the full circumference of the disc seating surface and provide, therebetween, a valley area 34 the same as in the previously described embodiment. The disc has an upper boss 36 and a lower boss 38 as previously described.

In the embodiment of FIG. 4 the shaft is integral, that is, it extends completely through the valve body and disc, with upper portion 26 and lower portion 28; however, the function of the valve stem remains the same as was described with reference to FIG. 1.

An arrangement for providing communication between the valley area 34 and the exterior of the valve body which is slightly different from the previously described embodiment is best illustrated in FIG. 5. The lower shaft portion 28 is received in recess 42 in the disc lower boss 38. Extending circumferentially around the lower shaft portion is a sealing groove 44 as previously described, having an O-ring 46 therein and, in addition, above O-ring 46, a second circumferential groove 68. A drilled hole 70 in the plane of groove 68 radially intercepts the lower passageway 50. Thus, communication is established between the shaft passageway 50 and groove 68. Extending from the disc valley area 34 to the lower boss recess 42 is the disc passageway 48.

This means of sealably communicating the lower shaft axial passageway 50 with the exterior of the valve body of the alternate embodiment is best illustrated in FIG. 6. The lower end of the lower shaft portion 28 has a circumferential recess 72 which receives a split thrust washer 74. The body lower block 76 retains the thrust washer 74 in position and the elevational position thereof may be varied by the use of spacers 78. A threaded opening 80 is formed in lower block 76 coaxial with the lower shaft axial passageway 50, the threaded opening receiving a fitting 82. The lower end of the lower shaft portion 28 has a recess 84 therein of larger diameter than passageway 50 and, in like manner, the fitting 82 has a recess 86, the recess 84 and 86 being thereby coaxial and of equal internal diameters. Received in recess 84 and 86 is a tubular pin 88 having a flow passageway 88A therethrough. The upper end of the tubular pin 88 has an external circumferential groove receiving O-ring 90 so that the pin passageway 88A is sealed to shaft passageway 50. An O-ring 92 with a groove in the lower peripheral surface of the tubular pin seals the passageway 88A with the passageway 82A of the fitting. Elements 82 and 88 may be made of one piece in which case O-ring 92 would not be required.

Closed communication is provided in the embodiments of FIGS. 4, 5, and 6, between the disc valley area 34 through disc passageway 48, grooves 68, hole 70, lower shaft passageway 50, tubular pin passageway 88A, and fitting passageway 82A to the exterior of the valve body. Devices attached to the externally threaded portion of the fitting can be employed to check the integrity of the valve in the same manner as provided for the first described embodiment.

In both the embodiments of FIGS. 1, 2, and 3, and that of FIGS. 4, 5, and 6, various seals, sleeves, and so forth are illustrated which have not been numbered or described since they are not directly related with the unique features of the invention and are more or less standard components in the construction of quality butterfly valves.

The improved butterfly valve having leak detecting means described herein fulfills the objectives initially set forth. Means is provided wherein the valve integrity may be checked without requiring an opening through the valve body and, most particularly, without requiring an opening through the valve seat. This is true whether the valve disc is of the all-metal type as shown in FIG. 1, or the elastomeric sealing type as in FIG. 4. The arrangements of the embodiments of the invention provide means where the devices attached to the exterior of the valve body are not rotated and thus the valve is readily adaptable to any type of apparatus for use in determining whether leakage is occurring past one or the other of the valve disc sealing edges. It can be seen that the integrity of the valve can be verified as long as the disc is in sealing condition whether or not it is precisely aligned with a specific point on the seat since the passageways remain the same at all times regardless of the position of the valve disc, unlike the prior art. The improvements of the invention are particularly important in the arrangement of the embodiment of FIGS. 1, 2, and 3 since the elastomeric portion 18A of the valve seat 18 does not need to be penetrated by an opening. It can be seen that if an opening existed through the valve seat and thence through the valve body that fluid could flow by way of this passageway to the mated fitting of the valve seat with the body fluid passageway 12 which could result in more rapid deterioration of the valve.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An improved butterfly valve having leak detecting means comprising:
    a valve body having a flow passageway therethrough and having coaxial top and bottom shaft openings intersecting the flow passageway, the body having a valve seat therein circumscribing said flow passageway;
    a disc having a circumferential sealing surface, the disc being supported in said body fluid passageway in a plane oblique to the axis of said shaft openings in said body, the disc being rotatable between an open position permitting fluid flow through the valve to either side of the disc, and a closed position wherein the disc circumferential sealing surface sealably contacts said valve seat around the full periphery thereof to block flow through said passageway, said valve seat and said disc sealing surface being cooperatively configured to provide two spaced apart, circumferential uninterrupted sealing contacts providing a circumferential valley therebetween;

an upper and a lower shaft portion received in said body shaft openings, one shaft portion being secured to said disc and extending externally of said valve body providing means of positioning the disc, one shaft portion having a passageway therein communicating with the exterior of the valve body, and the disc having a passageway communicating between said circumferential valley and said shaft passageway thereby providing communication between said circumferential valley and the exterior of the valve whereby any fluid leakage past said valve seat and disc sealing surface may be bled to the valve exterior.

2. An improved butterfly valve according to claim 1 including:
   a circumferential elastomeric seat member sealably received in said valve body fluid passageway; and
   said disc sealing surface having two spaced apart circumferential sealing ridges of increased diameter, the sealing ridges providing a circumferential valley therebetween, the sealing ridges sealably circumscribing the seat, communication with the closed valley area being had through said disc passageway and said shaft passageway.

3. An improved butterfly valve according to claim 1 wherein said disc sealing surface has two spaced apart circumferential grooves therein; and
   a continuous resilient seal positioned in each of said grooves, the seals resiliently engaging said valve seat and providing, when the valve is in closed position, a closed valley area between the seals circumscribing the disc sealing surface, communication with the closed valley area being provided through said disc passageway and said shaft passageway.

4. An improved butterfly valve according to claim 1 wherein said disc has a top and bottom integral boss portion displaced from said disc sealing surface, each boss portion having a recess therein, and wherein said upper and lower shaft portions each include portions received in said boss recesses, and wherein said disc passageway communicates with one of said boss recesses and said shaft portion received in said boss recess having said passageway therein communicating with the exterior of the valve body.

5. An improved butterfly valve according to claim 4 wherein the said shaft portion received in said boss recess having said disc passageway therein is defined by a circumferential groove in a plane perpendicular the shaft axis, and a hole drilled from said groove to intersect said shaft passageway whereby communication is provided from said disc sealing surface annular valley area through said disc passageway, through said shaft circumferential groove, through said shaft hole and said shaft passageway to the exterior of the valve body.

6. An improved butterfly valve according to claim 1 including:
   a lower plate removably attached to said valve body, the plate having a threaded opening therein in axial alignment with said valve body bottom shaft opening, said lower shaft having said shaft passageway therein being received in said body portion shaft opening, and means sealably communicating with said shaft passageay with the plate opening.

7. An improved butterfly valve according to claim 6 wherein said means of sealably communicating said shaft passageway with said plate opening comprises:
   said bottom shaft portion having, in the lower end thereof, an axial recess communicating with said shaft passageway, and said bottom plate having an integral upstanding cylindrical boss portion received in said bottom shaft recess, said plate boss portion being coaxial with said plate threaded opening and having an axial passageway therethrough.

8. An improved butterfly valve according to claim 6 wherein said means of sealably communicating said shaft passageway with said plate opening comprises:
   said bottom shaft portion having, in the lower end thereof, an axial recess communicating with said shaft passageway;
   a fitting threadably received in said plate threaded opening, the fitting having an upper recess therein coaxial with said bottom shaft recess, and having a passageway therethrough; and
   a tubular pin received in said bottom shaft recess having a flow passageway therethrough.

* * * * *